(12) United States Patent
Chiba

(10) Patent No.: US 10,625,801 B2
(45) Date of Patent: Apr. 21, 2020

(54) STRADDLE TYPE SEAT

(71) Applicant: TS TECH CO., LTD., Asaka-shi, Saitama (JP)

(72) Inventor: Tomohisa Chiba, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 90 days.

(21) Appl. No.: 15/814,989

(22) Filed: Nov. 16, 2017

(65) Prior Publication Data
US 2018/0141605 A1 May 24, 2018

(30) Foreign Application Priority Data
Nov. 21, 2016 (JP) ................................ 2016-226122

(51) Int. Cl.
*B62J 1/28* (2006.01)
*B62J 1/12* (2006.01)
*B62J 1/08* (2006.01)

(52) U.S. Cl.
CPC . *B62J 1/28* (2013.01); *B62J 1/12* (2013.01); *B62J 2001/085* (2013.01)

(58) Field of Classification Search
CPC ........... B62J 1/18; B62J 1/12; B62J 2001/085
USPC .................. 297/215.2, 406, 215.12
See application file for complete search history.

(56) References Cited

U.S. PATENT DOCUMENTS

| | | | | |
|---|---|---|---|---|
| 1,367,981 A | * | 2/1921 | Lawrence | ................... B62J 1/28 297/215.12 |
| 4,466,660 A | * | 8/1984 | Mabie | ................... B62J 7/04 297/215.11 |
| 4,953,911 A | * | 9/1990 | Hanagan | ................... B62J 1/00 297/195.12 |
| 4,993,731 A | * | 2/1991 | Fuller | ................... B62J 1/28 280/202 |
| 5,544,937 A | * | 8/1996 | Hanagan | ................. B29C 44/12 297/195.12 |
| 5,588,698 A | * | 12/1996 | Hsueh | ................... B62J 1/28 280/288.4 |
| 5,984,331 A | * | 11/1999 | Wright | ................. B62J 11/00 280/202 |
| 6,007,150 A | * | 12/1999 | Clerkin | ................. B62J 1/28 297/215.12 |
| 6,224,081 B1 | * | 5/2001 | Wayman | ................... B62J 1/12 280/288.4 |

(Continued)

FOREIGN PATENT DOCUMENTS

| | | |
|---|---|---|
| JP | H10-203445 A | 8/1998 |
| JP | 2015-217808 A | 12/2015 |
| WO | 2014/049723 A1 | 4/2014 |

*Primary Examiner* — Syed A Islam
(74) *Attorney, Agent, or Firm* — Faegre Drinker Biddle & Reath LLP

(57) ABSTRACT

The present disclosure is to improve workability of attaching and detaching a movable backrest to and from a seat body. A straddle type seat configured to support a rider seated to ride astride includes a seat body configured to support the seated rider, a backrest provided in the seat body, the backrest configured to support a rear portion of the rider, and a movable support device that supports the backrest movably with respect to the seat body. The movable support device has a stay portion attached to the seat body in a state where the stay portion is inserted through an insertion hole provided in the seat body, the insertion hole passing through in the up and down direction.

14 Claims, 11 Drawing Sheets

(56) References Cited

U.S. PATENT DOCUMENTS

| | | | |
|---|---|---|---|
| 6,390,220 B1* | 5/2002 | Galbraith | B62J 1/28 180/219 |
| 6,659,547 B2* | 12/2003 | Petersen | B62J 1/28 280/304.4 |
| 6,840,344 B2* | 1/2005 | Galbraith | B62J 7/04 180/219 |
| 6,971,714 B1* | 12/2005 | Hanagan | B62J 1/12 297/215.11 |
| 8,500,195 B2* | 8/2013 | Smith, II | B62J 1/28 297/215.11 |
| 9,957,010 B2* | 5/2018 | Roulund | B62J 1/28 |
| 2002/0089218 A1* | 7/2002 | Hanagan | B62J 1/12 297/215.12 |
| 2009/0115231 A1* | 5/2009 | Davis | B62J 1/28 297/215.12 |
| 2011/0115266 A1* | 5/2011 | Revell | B62J 1/28 297/215.12 |
| 2013/0214569 A1* | 8/2013 | Parvey | B62J 1/28 297/215.12 |
| 2014/0084644 A1* | 3/2014 | Grondin | B62J 1/12 297/215.12 |
| 2015/0251577 A1 | 9/2015 | Ishihara | |
| 2015/0329023 A1* | 11/2015 | Ishihara | B60N 2/865 297/406 |
| 2016/0325652 A1 | 11/2016 | Ishihara et al. | |

* cited by examiner

STRADDLE TYPE SEAT

CROSS-REFERENCE TO RELATED APPLICATIONS

This application claims the priority benefit of Japanese Patent Application No. JP 2016-226122, filed on Nov. 21, 2016, the contents being incorporated herein by reference.

BACKGROUND

The present disclosure relates to a straddle type seat including a backrest.

In a vehicle such as a motorcycle, a straddle type seat on which a rider is seated to ride astride is adopted. In such a straddle type seat, for example, as described in Japanese Unexamined Patent Application Publication No. 10-203445, in order to support a bottom portion and a waist portion of the rider from the rear side and maintain a stable seating posture, a backrest may be provided on the rear side of a seating portion.

However, in the above related art, the backrest is fixed to a main seat, and the backrest cannot be attached or detached according to need.

SUMMARY

The present disclosure has been made in view of the above-described problem, and an embodiment of the present disclosure provides a straddle type seat capable of improving workability of attaching and detaching a movable backrest to and from a seat body.

In an embodiment, a straddle type seat according to the present disclosure is configured to support a rider seated to ride astride, and includes a seat body configured to support the seated rider, a backrest provided in the seat body, the backrest configured to support a rear portion of the rider, and a support portion that supports the backrest movably with respect to the seat body, wherein the support portion has an attachment portion attached to the seat body in a state where the attachment portion is inserted through an insertion hole provided in the seat body, the insertion hole passing through in the up and down direction. With the above straddle type seat, the workability of attaching and detaching the movable backrest to and from the seat body can be improved. With the above straddle type seat, freedom of an attachment position of the movable backrest to the seat body can be enhanced.

In the above-described straddle type seat, the support portion may have a pillar portion that extends in the up and down direction, and the backrest may be movable in the up and down direction along the pillar portion. With this configuration, an up-down position of the backrest can be adjusted.

The above-described straddle type seat may further include an up-down locking portion inside the backrest, the up-down locking portion configured to fix at least one of positions of the backrest in the up and down direction with respect to the pillar portion. With this configuration, the up-down position of the backrest can be fixed at a desired position.

In the above-described straddle type seat, the support portion may make the backrest movable in the front to back direction with respect to the seat body, and the straddle type seat may further include a front-back locking portion provided inside the backrest, the front-back locking portion configured to fix at least one of positions of the backrest in the front to back direction with respect to the pillar portion. With this configuration, a front-back position of the backrest can be fixed at a desired position.

The above-described straddle type seat may further include an operation portion configured to cancel locking made by the up-down locking portion and the front-back locking portion at the same time, wherein the operation portion may be exposed from the backrest. With this configuration, the movable backrest is movable in the up and down direction and in the front to back direction by an operation of the operation portion. Thereby, workability of adjusting the position of the backrest is improved.

In the above-described straddle type seat, the support portion may have a pair of the pillar portions, a coupling portion that couples the pair of pillar portions, and a stay portion that extends downward from the coupling portion, the stay portion being inserted through the through hole. With this configuration, the movable backrest can be stably supported. Thereby, the movable backrest can stably support the rear portion of the rider.

The above-described straddle type seat may further include first and second rearward extending portions attached to the stay portion, wherein the rearward extending portions respectively extend rearward, and wherein the first rearward extending portion and the second rearward extending portion may be fixed to the seat body. With this configuration, attachment rigidity of the movable backrest to the seat body can be enhanced.

In the above-described straddle type seat, the stay portion, the first rearward extending portion, and the second rearward extending portion may form a closed section. With this configuration, the movable backrest can be firmly fixed to the seat body. Force applied to the movable backrest can be efficiently divided into the stay portion, the first rearward extending portion, and the second rearward extending portion.

In the above-described straddle type seat, the through hole may be formed between two mounts provided on a back surface of the seat body in the seat width direction. With this configuration, a rightward and leftward wobble of the backrest can be suppressed.

In the above-described straddle type seat, the backrest and the support portion may be integrated, and the backrest and the support portion may be detachable from the seat body. With this configuration, attachment and detachment of the movable backrest are easily switched.

According to various embodiments of the present disclosure, the workability of attaching and detaching the backrest to and from the seat body can be improved. According to an embodiment of the present disclosure, the up-down position of the backrest can be adjusted. According to an embodiment of the present disclosure, the up-down position of the backrest can be fixed at a desired position. According to an embodiment of the present disclosure, the front-back position of the backrest can be fixed at a desired position. According to an embodiment of the present disclosure, the workability of adjusting the position of the backrest is improved. According to an embodiment of the present disclosure, the backrest can stably support the rear portion of the rider. According to an embodiment of the present disclosure, the attachment rigidity of the backrest to the seat body can be enhanced. According to an embodiment of the present disclosure, the backrest can be firmly fixed to the seat body. According to an embodiment of the present disclosure, the rightward and leftward wobble of the backrest can be suppressed. According to an embodiment of the present disclosure, the attachment and the detachment of the backrest are easily switched.

DETAILED DESCRIPTION

A seat 2 according to an embodiment of the present disclosure (hereinafter, referred to as the present embodiment) is described hereinafter with reference to FIGS. 1 to 11. The seat 2 according to the present embodiment is an example in which a straddle type seat according to the present disclosure is applied to a seat for a motorcycle. However, the seat 2 does not limit the present disclosure but only serves as one example for facilitating understanding of the present disclosure. That is, the shape, size, arrangement, and the like of members to be described below can be modified or improved without departing from the gist of the present disclosure, and the present disclosure includes equivalents thereof as a matter of course. Hereinafter, the front to back direction, the right and left direction, and the up and down direction match with those directions in the eyes of a seated occupant of the seat 2.

Figure 1:
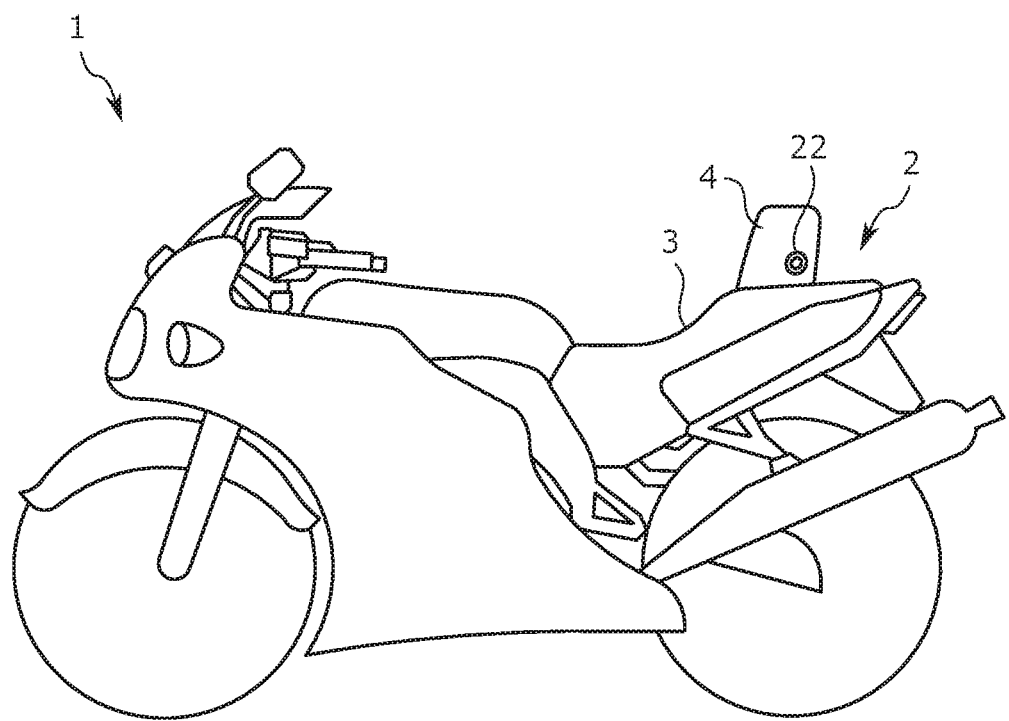
FIG. 1 is a side view showing a motorcycle in which a seat according to the present embodiment is mounted.

FIG. 1 shows an outer appearance of a motorcycle 1 in which the seat 2 according to the present embodiment is mounted. As shown in FIG. 1, the motorcycle 1 has a similar configuration as a general motorcycle except for a point that the seat 2 is provided. The seat 2 is a saddle type seat on which a rider (driver) is seated to ride astride, the seat being provided detachably from the motorcycle 1. Specifically, attachment holes (not shown) are formed in the motorcycle 1, and the seat 2 is attached to the motorcycle 1 by utilizing the attachment holes and fastening tools.

Figure 2:
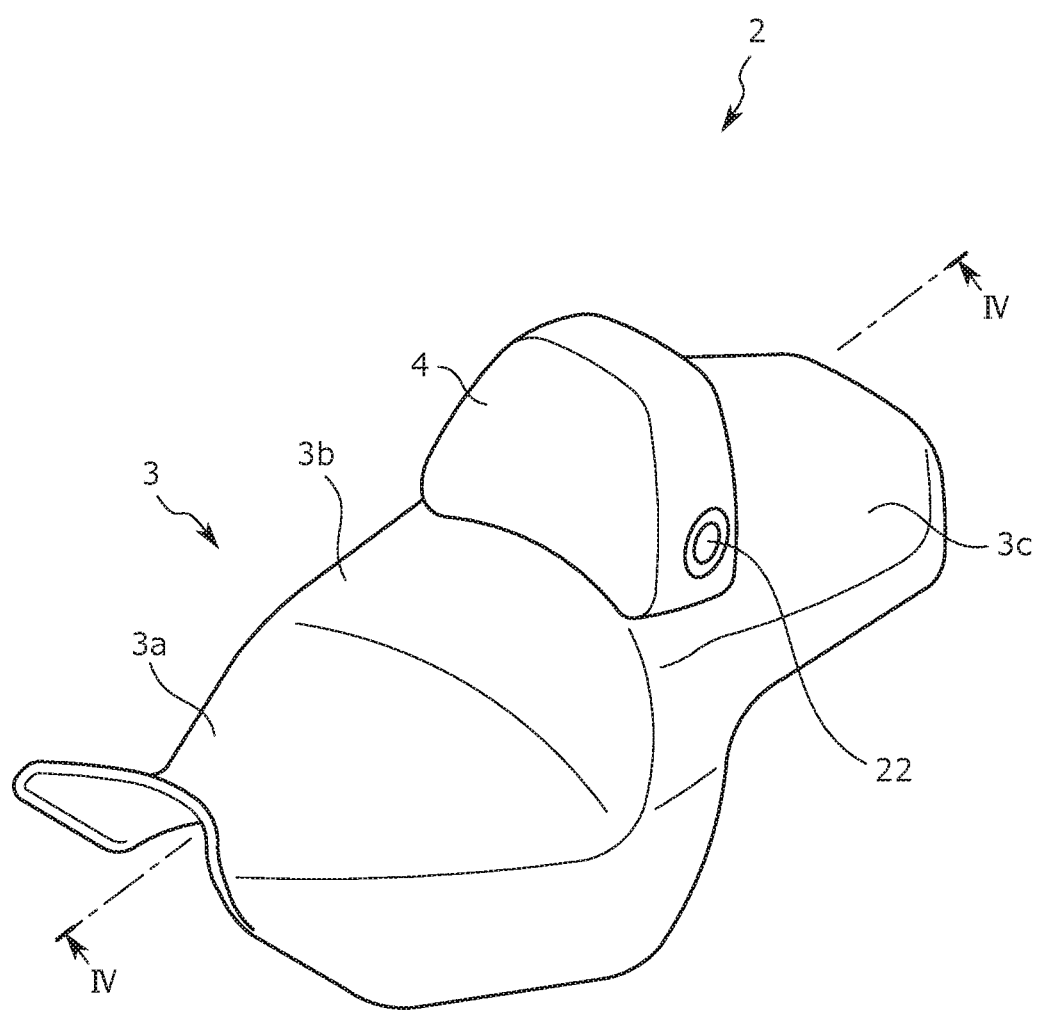
FIG. 2 is a perspective view of the seat according to the present embodiment.

Next, a configuration of the seat 2 is described with reference to FIG. 2. As shown in FIG. 2, the seat 2 includes a seat body 3 and a backrest 4 provided on the seat body 3.

The seat body 3 has a seating portion 3a, an inclined portion 3b, and a rear portion 3c, in order from the front side. The seating portion 3a forms a surface that supports a bottom portion of the rider in a state where the rider is seated on the seat 2. The inclined portion 3b couples the seating portion 3a and the rear portion 3c and forms a surface inclined obliquely rearward from a rear end of the seating portion 3a. The inclined portion 3b forms a surface that supports a waist portion of the rider in a state where the rider is seated on the seat 2. The rear portion 3c is connected to the inclined portion 3b and provided at a position higher than the seating portion 3a in the up and down direction. In the present embodiment, the backrest 4 is detachably attached to the rear portion 3c. For example, in a case where the backrest 4 is detached, the rear portion 3c may be utilized as a rear seat for a two-seated motorcycle. In the thickness direction of the seat body 3, as shown in FIG. 4, a cushion material 3d is disposed on a resin frame 3e, and further, the cushion material 3d is covered with a skin material (not shown).

The backrest 4 is attached to a front portion of the rear portion 3c, and forms a surface that supports the waist portion and a back portion of the rider in a state where the rider is seated on the seat 2. That is, the backrest 4 can support a rear portion (the waist portion and the back portion) of the rider. In the present embodiment, the backrest 4 is a movable backrest having adjustable up-down and front-back positions. In a state where an operation portion 22 provided in a side portion of the backrest 4 is pushed in, a locking mechanism that locks the position of the backrest 4 is released, and the up-down and front-back positions of the backrest 4 can be adjusted. Hereinafter, a position adjustment mechanism provided in the backrest 4 is described with reference to FIGS. 3 and 4.

Figure 3:
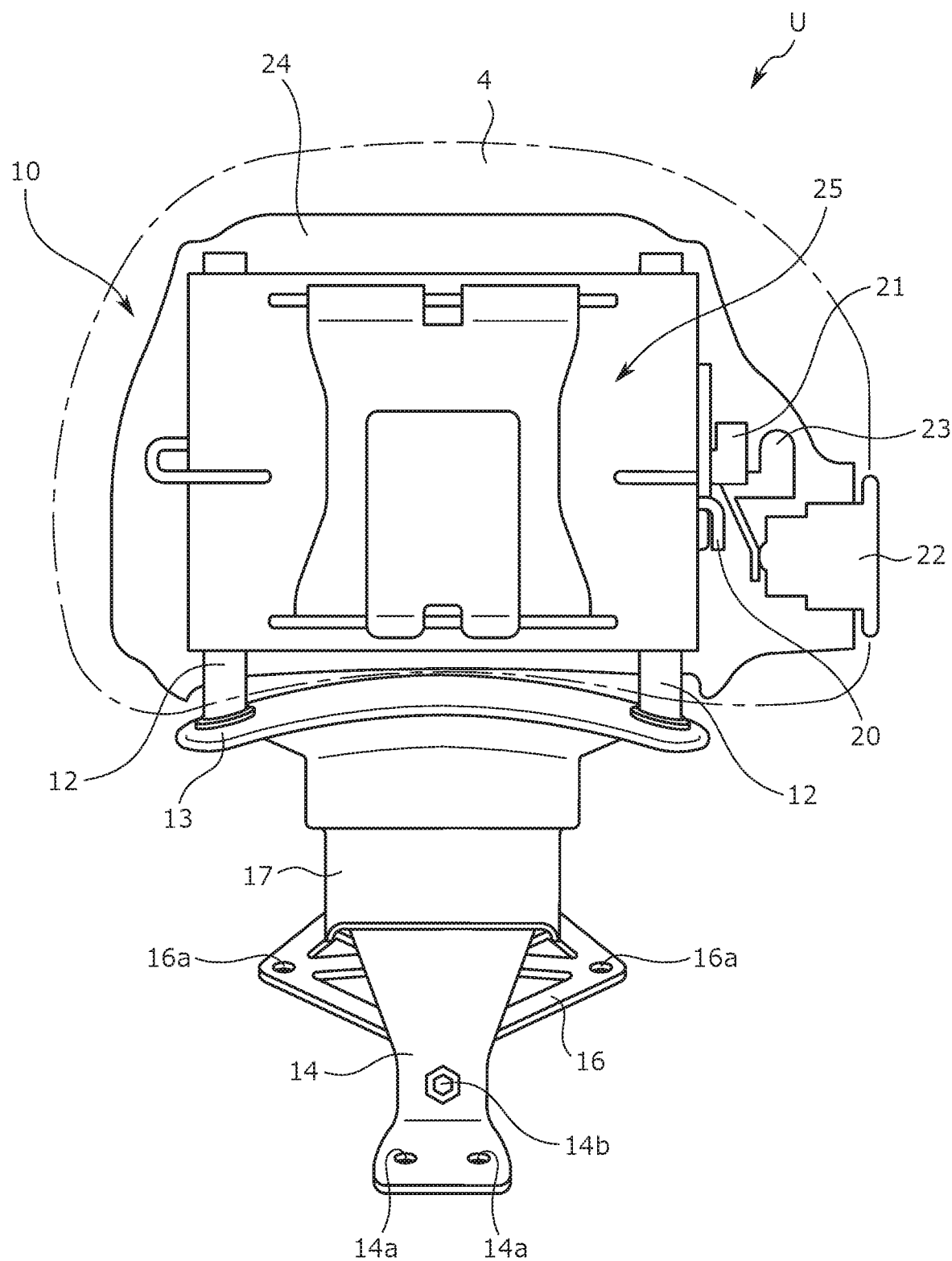
FIG. 3 is a front view of a movable backrest unit, according to an embodiment.
Figure 4:
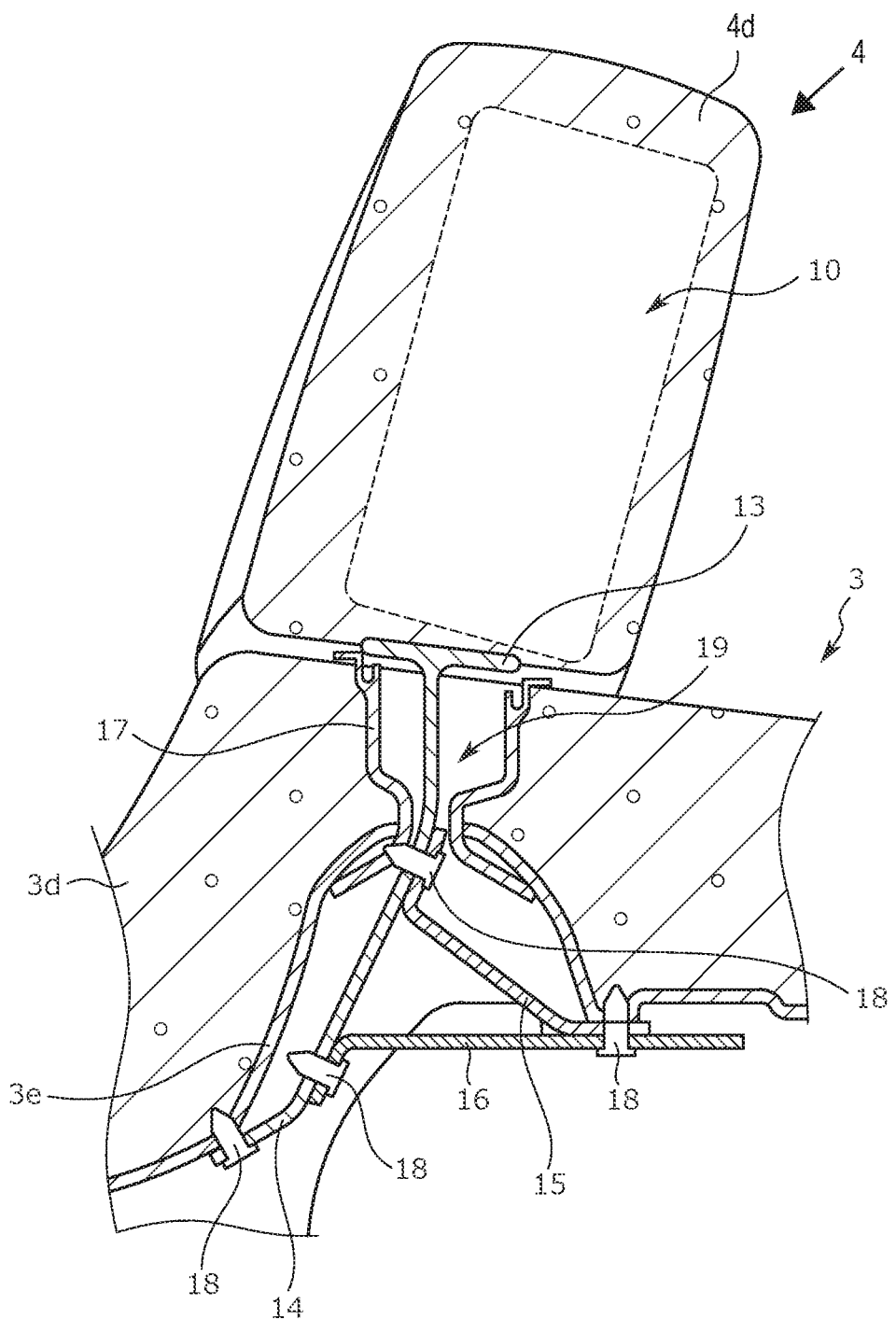
FIG. 4 is a cross-sectional view by the line IV-IV in the vicinity of a backrest of FIG. 2, according to an embodiment.

FIGS. 3 and 4 show a movable backrest unit U in which the backrest 4, having a cushion material 4d, and a movable support device 10 (one example of a support portion), configured to adjust the position of the backrest 4, are integrated. The movable backrest unit U is detachable from the seat body 3. FIG. 4 shows a cross-sectional view along the center line of the seat 2 in the seat width direction in the vicinity of the backrest 4 of the seat 2.

As shown in FIGS. 3 and 4, the movable support device 10 includes pillar portions 12, a coupling portion 13, a stay portion 14, a first bracket 15, a second bracket 16, an up-down locking portion 20, a front-back locking portion 21, the operation portion 22, a link 23, a case 24, and a movable mechanism 25.

The case 24 is arranged inside the backrest 4, and houses the up-down locking portion 20, the front-back locking portion 21, the operation portion 22, the link 23, and the movable mechanism 25. The movable mechanism 25 is attached to the pillar portions 12, and is movable in the up and down direction along the pillar portions 12, and also movable in the front to back direction with respect to the pillar portions 12. In accordance with a movement of a position of the movable mechanism 25, the position of the backrest 4 is moved. Known mechanisms described, for example, in Japanese Unexamined Patent Application Publication No. 2015-217808, International Publication No. 2014/049723, and the like can be adopted as the movable mechanism 25. Thus, details of a configuration of the movable mechanism 25 will not be described below.

The up-down locking portion 20 is a locking member that regulates upward and downward movements of the movable mechanism 25. In a case where locking is made by the up-down locking portion 20, at least one of the movements of the movable mechanism 25 in the up and down direction is restricted. In the present embodiment, in a state where locking is made by the up-down locking portion 20, the downward movement of the movable mechanism 25 is restricted. That is, in a case where locking is made by the up-down locking portion 20, the downward movement of the movable mechanism 25, that is, the backrest 4 is regulated but the upward movement is available. In a case where the locking made by the up-down locking portion 20 is canceled, the upward and downward movements of the movable mechanism 25, that is, the backrest 4 are available. The up-down locking portion 20 is not limited to the one that restricts the downward movement in a locked state but may be the one that restricts the upward movement or both the upward and downward movements.

The front-back locking portion 21 is a locking member that regulates forward and rearward movements of the movable mechanism 25. In a case where locking is made by the front-back locking portion 21, at least one of the movements of the movable mechanism 25 in the front to back direction is restricted. In the present embodiment, in a state where locking is made by the front-back locking portion 21, the rearward movement of the movable mechanism 25 is restricted. That is, in a state where locking is made by the front-back locking portion 21, the rearward movement of the movable mechanism 25, that is, the backrest 4 is regulated but the forward movement is available. In a case where the locking made by the front-back locking portion 21 is canceled, the forward and rearward movements of the movable mechanism 25, that is, the backrest 4 are available. The front-back locking portion 21 is not limited to the one that restricts the rearward movement in a locked state but may be the one that restricts the forward movement or both the forward and rearward movements.

The operation portion 22 is a button operation member partly exposed from the backrest 4. By operating the operation portion 22, the locking made by the up-down locking portion 20 and the front-back locking portion 21 is canceled via the link 23 engaged with the operation portion 22. That is, the operation portion 22 can cancel the locking made by the up-down locking portion 20 and the front-back locking portion 21 at the same time. Specifically, in a state where the operation portion 22 is pushed in, the locking made by the up-down locking portion 20 and the locking made by front-back locking portion 21 is canceled at the same time. Thus, the upward, downward, forward, and rearward movements of the movable mechanism 25 are available. Meanwhile, in a state where the operation portion 22 is not pushed in, the locking is made by the up-down locking portion 20 and the front-back locking portion 21. Thus, the downward and rearward movements of the movable mechanism 25 are restricted.

The pillar portions 12 are columnar members that extend in the up and down direction. In the movable backrest unit U, the pair of pillar portions 12 separated from each other in the right and left direction is provided. Lower ends of the pair of pillar portions 12 are coupled by the coupling portion 13.

The coupling portion 13 is a curved plate shaped member having a shape along a surface of the rear portion 3c of the seat body 3. The stay portion 14 (one example of an attachment portion) extending downward is formed on a lower surface of the coupling portion 13.

The stay portion 14 is attached to the seat body 3 in a state where the stay portion is inserted through a through hole 19 formed in the seat body 3 in the up and down direction. Specifically, the stay portion 14 is fastened to the resin frame 3e of the seat body 3 at a first attachment hole 14a formed in a lower end portion by using fasteners 18 such as bolts.

In the stay portion 14, a plurality of welded nuts 14b are provided in the up and down direction. The first bracket 15 (one example of a first rearward extending portion) extending rearward from the stay portion 14 is attached to the upper welded nut 14b by the fasteners 18. The second bracket 16 (one example of a second rearward extending portion) extending rearward from the stay portion 14 is attached to the lower welded nuts 14b of the stay portion 14 by the fasteners 18. Rear end portions of the first bracket 15 and the second bracket 16 are fastened to the resin frame 3e by the fasteners 18. At second attachment holes 16a of the second bracket 16, the second bracket 16 may be fixed to the resin frame 3e by the fasteners 18.

As shown in FIGS. 3 and 4, an upper portion of the stay portion 14, which is a portion ranging from a portion connected to the coupling portion 13 to the vicinity of a center portion, is covered with a cover member 17. An upper end of the cover member 17 is engaged with the coupling portion 13, and the cover member 17 branches off in the front to back direction of the seat 2 on the lower side of the through hole 19. The branching lower end portions of the cover member 17 may respectively be fixed to the resin frame 3e.

Figure 5:
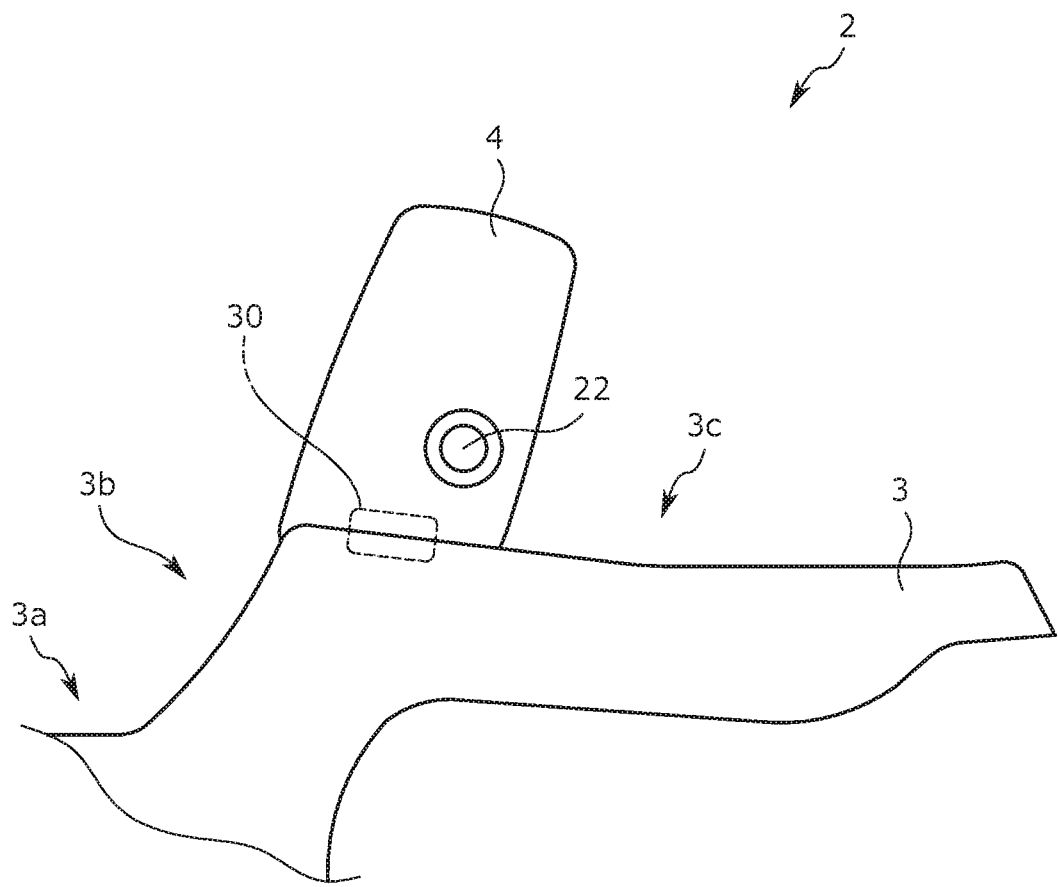
FIG. 5 is a side view illustrating position adjustment of the backrest, according to an embodiment.

Next, actions of the backrest 4 at the time of position adjustment are described with reference to FIGS. 5 to 8. FIG. 5 shows a state where a front end of the backrest 4 is placed at a position in a rear end of the inclined portion 3b and the backrest 4 is in contact with the rear portion 3c.

Figure 6:
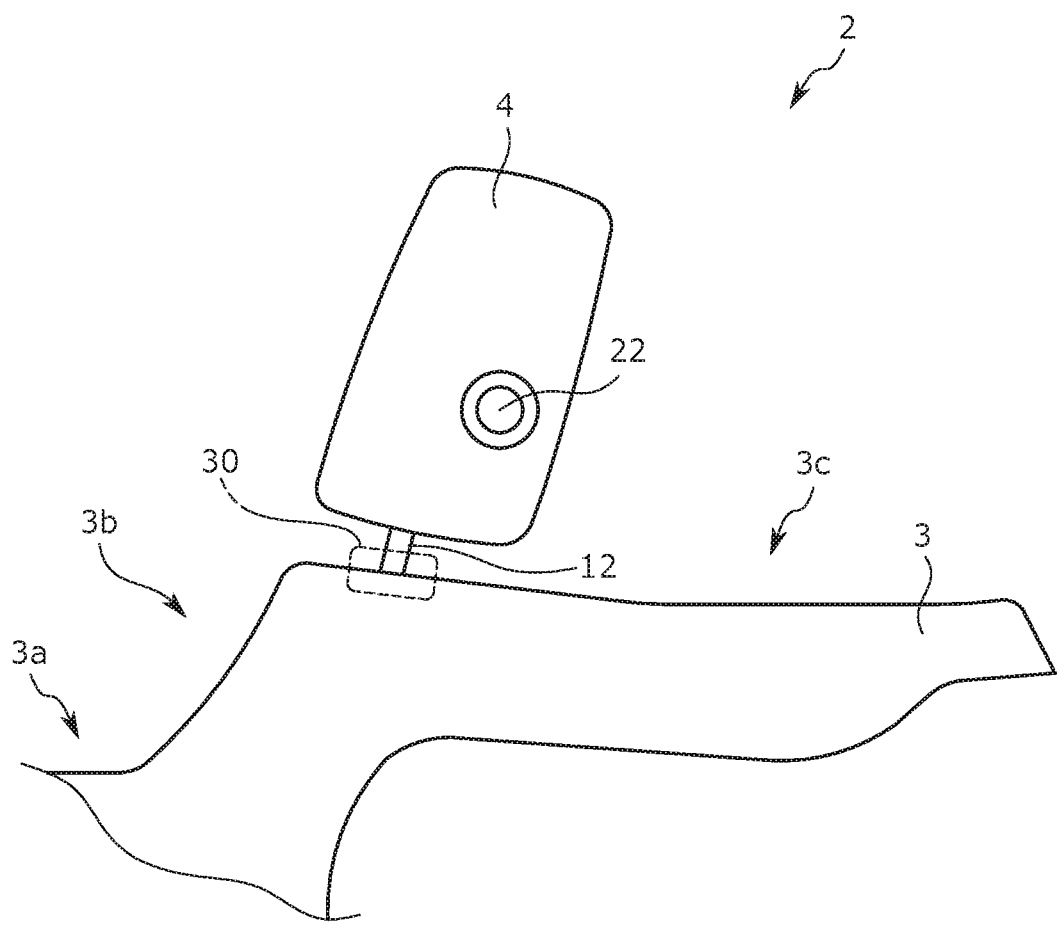
FIG. 6 is a side view illustrating the position adjustment of the backrest, according to an embodiment.

When the backrest 4 is pulled upward, the backrest 4 is moved upward along the pillar portions 12 as shown in FIG. 6. The downward movement of the backrest 4 is restricted by the up-down locking portion 20. Thus, in order to move the backrest 4 downward, the backrest 4 is pushed downward in a state where the operation portion 22 is pushed in. By the above operation, the state shown in FIG. 6 is returned back to the state shown in FIG. 5.

Figure 7:
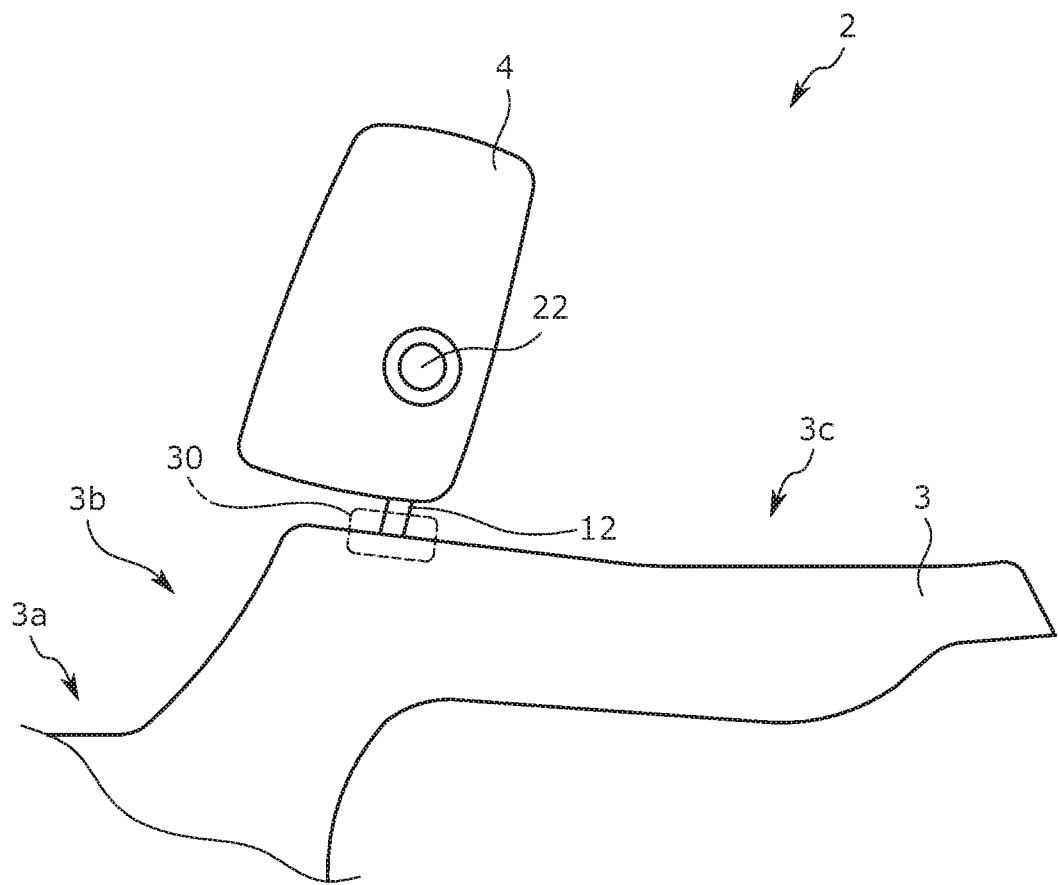
FIG. 7 is a side view illustrating the position adjustment of the backrest, according to an embodiment.
Figure 8:
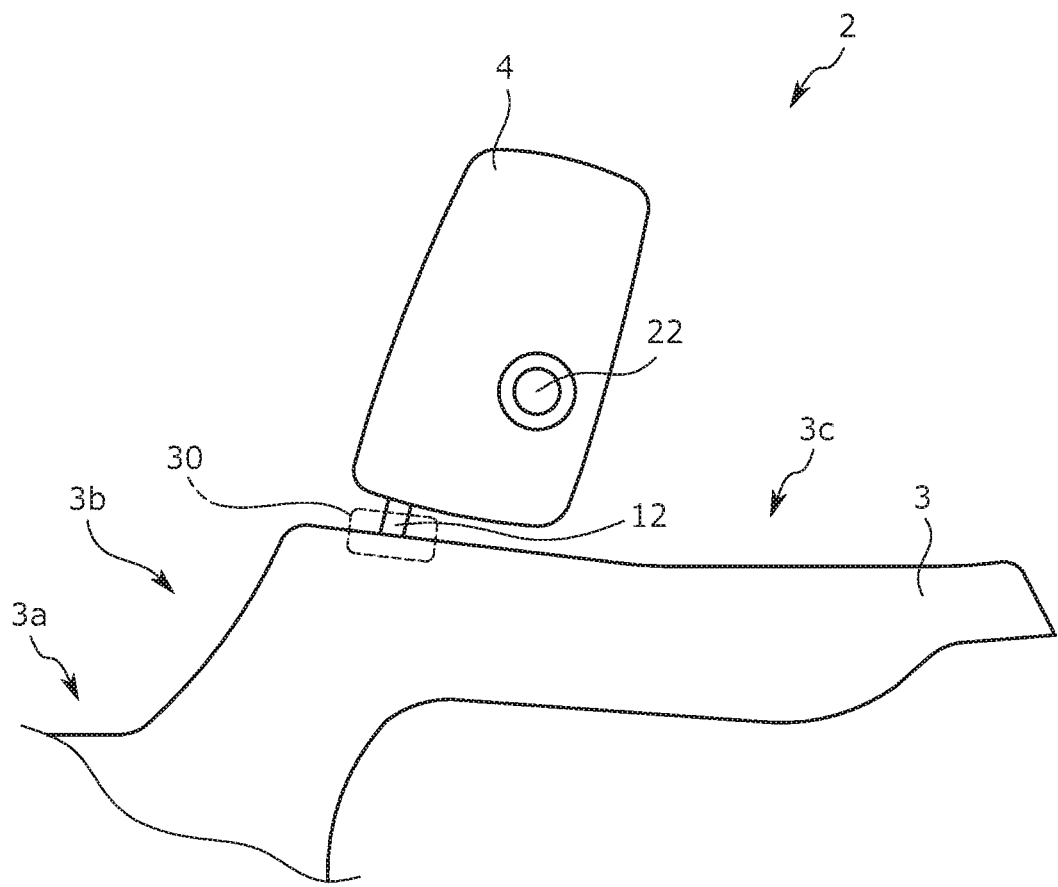
FIG. 8 is a side view illustrating the position adjustment of the backrest, according to an embodiment.

Further, when the backrest 4 is pushed forward from the state shown in FIG. 6, the backrest 4 is moved forward with respect to the pillar portions 12 as shown in FIG. 7. The rearward movement of the backrest 4 is restricted by the front-back locking portion 21. Thus, in order to move the backrest 4 rearward, the backrest 4 is moved rearward in a state where the operation portion 22 is pushed in. By the above operation, the state shown in FIG. 6 is shifted to the state shown in FIG. 8.

In such a way, by moving the backrest 4 upward, downward, forward, and rearward while operating the operation portion 22 according to need, the backrest 4 is movable to a desired position of the rider.

Next, tasks of attaching and detaching the movable backrest unit U to and from the seat body 3 are described.

Figure 9:
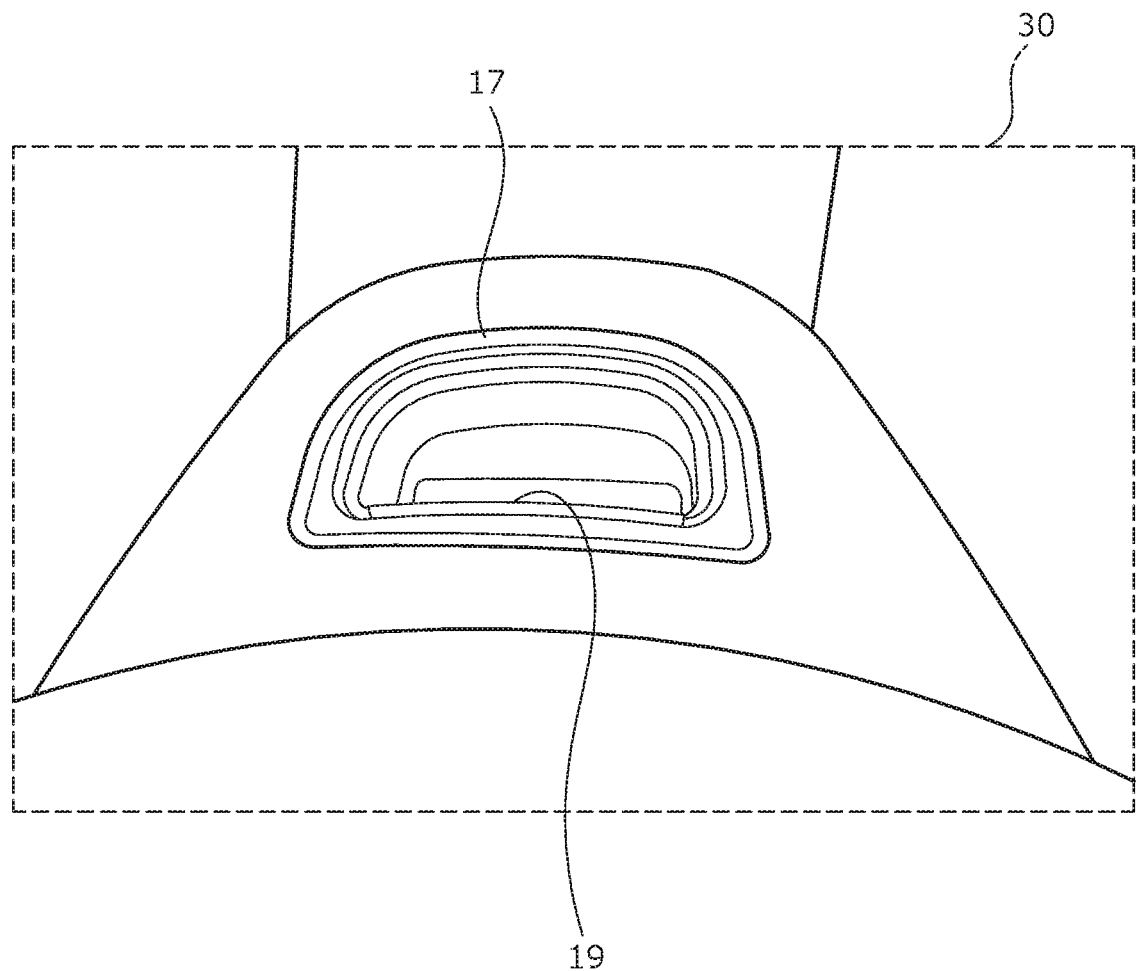
FIG. 9 is a top, schematic view relating to an attachment part of the movable backrest unit and showing a configuration of a seat body on the surface side, according to an embodiment.
Figure 10:
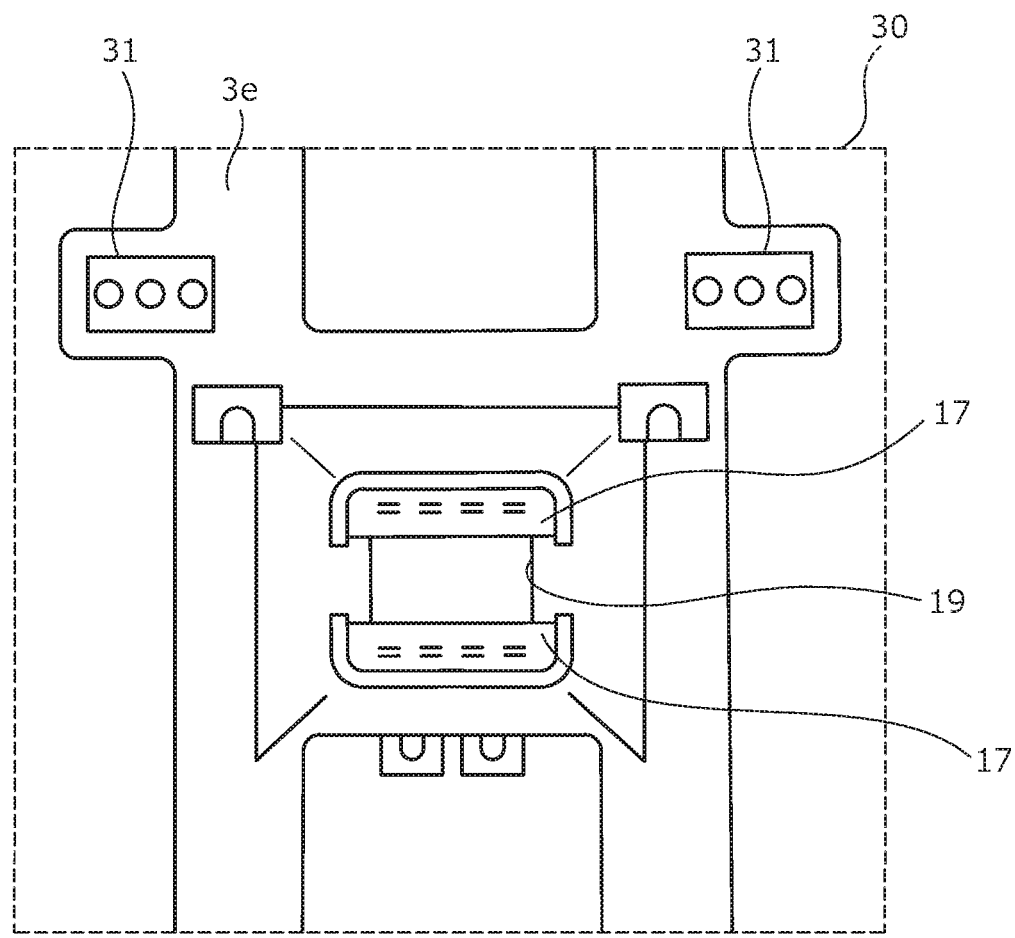
FIG. 10 is a top, schematic view relating to the attachment part of the movable backrest unit and showing a configuration of the seat body on the back surface side, according to an embodiment.

FIG. 9 relates to an attachment part 30 of the backrest 4 and the seat body 3, and shows a configuration of the seat body 3 on the surface side. FIG. 10 relates to the attachment part 30, and shows a configuration of the seat body 3 on the back surface side.

As shown in FIGS. 9 and 10, the cover member 17 is fitted into the through hole 19. The lower end of the stay portion 14 of the movable backrest unit U from which the first bracket 15 and the second bracket 16 are detached passes through the through hole 19. The cover member 17 is configured to prevent entry of water into the skin material and the cushion material 3d and to discharge water accumulated on the surface of the seat body 3 to the back surface side through the through hole 19. The first attachment hole 14a of the lower end of the stay portion 14 is attached to the resin frame 3e, and the first bracket 15 and the second bracket 16 are attached to the stay portion 14, so that the movable backrest unit U is fixed to the seat body 3. The through hole 19 is formed between right and left mounts 31 formed in the resin frame 3e of the seat body 3. Therefore, by attaching the movable backrest unit U between the mounts 31 in the seat width direction through the through hole 19, a rightward and leftward wobble of the position of the movable backrest unit U is suppressed.

Figure 11:
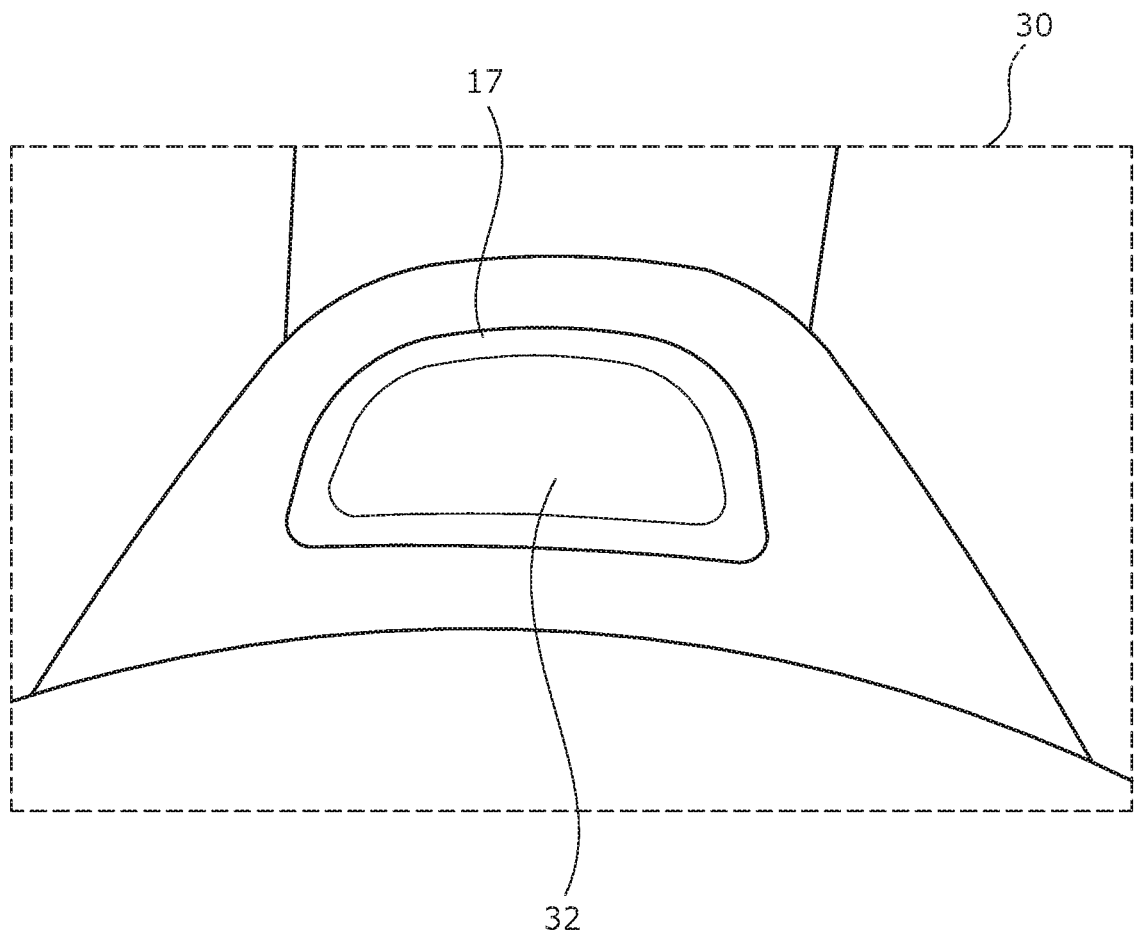
FIG. 11 is a top, schematic view showing a state where a lid is engaged with a cover member, according to an embodiment.

Next, in a case where the movable backrest unit U is detached from the seat body 3, the fasteners 18 relating to attachment of the movable backrest unit U are loosened, and the first bracket 15 and the second bracket 16 are detached from the stay portion 14. The movable backrest unit U from which the first bracket 15 and the second bracket 16 are detached is pulled up, and the movable backrest unit U is detached from the seat body 3. As shown in FIG. 11, a lid 32 is fitted to an upper opening of the cover member 17 to close the opening.

With the seat 2 according to the present embodiment described above, workability of attaching and detaching the movable backrest 4 to and from the seat body 3 can be enhanced. By changing a position of the through hole formed in the seat body 3, the attachment position of the movable backrest 4 can be easily changed. Thus, freedom of the attachment position to the seat body 3 can be enhanced. With the seat 2, the up-down and front-back positions of the backrest 4 can be adjusted by the movable support device 10. With the seat 2, while the operation portion 22 is operated, the backrest 4 is freely movable in the up and down direction and in the front to back direction. Thereby, the workability of adjusting the position of the movable backrest is improved. While the operation portion 22 is not operated, the downward and rearward movements of the backrest 4 are restricted. Thus, the backrest 4 can be prevented from moving at timing when the rider does not expect movement. With the seat 2, since the movable support device 10 includes the pair of pillar portions 12, the coupling portion 13 that couples the pair of pillar portions 12, and the stay portion 14 extending downward from the coupling portion 13, rigidity of a lower portion of the movable support device 10 is enhanced. Therefore, the movable support device 10 can stably support the backrest 4. Thereby, the backrest 4 can stably support the rear portion of the rider. With the seat 2, the stay portion 14, the first bracket 15 and the second bracket 16 form a closed section. Thus, the movable support device 10 can be firmly attached to the seat body 3. With the seat 2, by fixing the movable backrest unit U to the seat body 3 with using the stay portion 14, the first bracket 15, and the second bracket 16, the attachment rigidity of the backrest 4 to the seat body 3 can be enhanced. With the seat 2, by attaching the backrest 4 between the right and left mounts 31, the rightward and leftward wobble of the backrest 4 is suppressed, so that the rear portion of the rider can be stably supported. With the seat 2, the backrest 4 and the movable support device 10 are integrated as the movable backrest unit U. Thus, attachment and detachment of the movable backrest unit U are easily switched.

The present disclosure is not limited to the above embodiment. For example, the straddle type seat according to the present disclosure is not limited to a motorcycle but can also be applied to a seat for a vehicle, a ship, an airplane, and the like.

Through holes 19 may be formed at a plurality of positions of the seating portion 3a of the seat body 3, so that a plurality of positions for the backrest 4 to be attached are provided.

What is claimed is:

1. A straddle type seat configured to support a rider seated to ride astride, comprising:
   a seat body configured to support the seated rider;
   a backrest provided in the seat body, the backrest configured to support a rear portion of the rider;
   a support portion that supports the backrest movably with respect to the seat body; and
   a locking member configured to regulate a movement of the backrest, wherein the support portion has:
      a pair of pillar portions that extend in an up and down direction,
      a coupling portion that couples the pair of pillar portions,
      a stay portion that extends downward from the coupling portion, the stay portion being attached to the seat body in a state where the stay portion is inserted through a through hole provided in the seat body, the through hole passing through in the up and down direction,
   the backrest has a cushion material and is movable in the up and down direction along the pair of pillar portions, and
   the locking member is arranged inside the cushion material of the backrest and includes an up-down locking portion configured to fix at least one of positions of the backrest in the up and down direction with respect to the pair of pillar portions.

2. The straddle type seat according to claim 1, wherein the support portion is configured for the backrest to be movable in a front to back direction with respect to the seat body, and
   the locking member includes a front-back locking portion configured to fix at least one of positions of the backrest in the front to back direction with respect to the pair of pillar portions.

3. The straddle type seat according to claim 2, further comprising:
   an operation portion configured to cancel locking made by the up-down locking portion and the front-back locking portion at the same time, wherein
   the operation portion is a button operation member partly exposed from the cushion material of the backrest.

4. The straddle type seat according to claim 1, further comprising:
   first and second rearward extending portions attached to the stay portion, wherein the rearward extending portions respectively extend rearward, wherein
   the first rearward extending portion and the second rearward extending portion are fixed to the seat body.

5. The straddle type seat according to claim 4, wherein the stay portion, the first rearward extending portion, and the second rearward extending portion form a closed section.

6. The straddle type seat according to claim 1, wherein the through hole is formed between two mounts provided on a back surface of the seat body in a seat width direction.

7. The straddle type seat according to claim 1, wherein the backrest and the support portion are integrated, and the backrest and the support portion are detachable from the seat body.

8. A straddle type seat configured to support a rider seated to ride astride, comprising:
   a seat body configured to support the seated rider;
   a backrest provided in the seat body, the backrest configured to support a rear portion of the rider; and
   a support portion that supports the backrest movably with respect to the seat body, wherein:
   the support portion has:
      a pair of pillar portions that extend in an up and down direction,
      a coupling portion that couples the pair of pillar portions,
      a stay portion that extends downward from the coupling portion, the stay portion being attached to the seat body in a state where the stay portion is inserted through a through hole provided in the seat body, the through hole passing through in the up and down direction,
      a first rearward extending portion that is attached to the stay portion and extends rearward, and
      a second rearward extending portion that is attached to the stay portion, extends rearward, and is arranged below the first rearward extending portion;
   the first rearward extending portion and the second rearward extending portion are fixed to the seat body; and
   the stay portion, the first rearward extending portion, and the second rearward extending portion are coupled with each other and form a closed section in a vertical cross section.

9. The straddle type seat according to claim 8, wherein the backrest is movable in the up and down direction along the pair of pillar portions.

10. The straddle type seat according to claim 9, further comprising:
   an up-down locking portion provided inside the backrest, the up-down locking portion configured to fix at least one of positions of the backrest in the up and down direction with respect to the pair of pillar portions.

11. The straddle type seat according to claim 10, wherein
   the support portion is configured for the backrest to be movable in a front to back direction with respect to the seat body, and
   the straddle type seat further comprises:
   a front-back locking portion provided inside the backrest, the front-back locking portion configured to fix at least one of positions of the backrest in the front to back direction with respect to the pair of pillar portions.

12. The straddle type seat according to claim 11, further comprising:
   an operation portion configured to cancel locking made by the up-down locking portion and the front-back locking portion at the same time, wherein
   the operation portion is a button operation member partly exposed from a cushion material of the backrest.

13. The straddle type seat according to claim 8, wherein the through hole is formed between two mounts provided on a back surface of the seat body in a seat width direction.

14. The straddle type seat according to claim 8, wherein the backrest and the support portion are integrated, and the backrest and the support portion are detachable from the seat body.

* * * * *